(12) United States Patent
Mair

(10) Patent No.: US 9,707,965 B2
(45) Date of Patent: Jul. 18, 2017

(54) METHOD FOR FREEING A MOTOR VEHICLE BY ROCKING

(71) Applicant: ZF Friedrichshafen AG, Friedrichshafen (DE)

(72) Inventor: Roland Mair, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 252 days.

(21) Appl. No.: 14/684,540

(22) Filed: Apr. 13, 2015

(65) Prior Publication Data

US 2015/0291166 A1    Oct. 15, 2015

(30) Foreign Application Priority Data

Apr. 14, 2014    (DE) .................. 10 2014 207 081

(51) Int. Cl.
  *B60W 10/02*    (2006.01)
  *B60W 10/06*    (2006.01)
  (Continued)

(52) U.S. Cl.
  CPC ...... *B60W 30/18045* (2013.01); *B60W 10/02* (2013.01); *B60W 10/06* (2013.01);
  (Continued)

(58) Field of Classification Search
  None
  See application file for complete search history.

(56) References Cited

U.S. PATENT DOCUMENTS 4,914,983 A * 4/1990 Simonyi ........ B60W 30/18045
                                                          192/92
7,302,333 B2    11/2007 Steen et al.
(Continued)

FOREIGN PATENT DOCUMENTS

DE    41 01 610 C1    8/1992
DE    101 05 749 A1   8/2002
(Continued)

OTHER PUBLICATIONS

German Search Report Corresponding to 10 2014 207 081.3 mailed Jan. 7, 2015.
(Continued)

*Primary Examiner* — Edwin A Young
(74) *Attorney, Agent, or Firm* — Davis & Bujold, PLLC; Michael J. Bujold

(57) ABSTRACT

A method for rocking a motor vehicle free. The vehicle has a drive-train with an automatic drive torque adjusting element, which transmits torque to a wheel, and a rotational speed and direction sensor system for detecting movement of the vehicle such that when the accelerator pedal is biased to a position different from its non-actuated position a desired drive torque can be produced. The torque adjusting element can be controlled based on the accelerator pedal position in relation to the drive torque that can be produced by the driver, and, in a rocking-free process, alternating deflection and release of the accelerator pedal causes the drive torque to fluctuate. With the rotational speed and direction sensor system, the drive torque adjusting element is controlled to suppress drive torque transmission if the travel direction of a current unpowered vehicle movement is not the same as a forthcoming power-driven vehicle movement.

6 Claims, 2 Drawing Sheets

(51) Int. Cl.
*B60W 30/18* (2012.01)
*B60W 10/11* (2012.01)

(52) U.S. Cl.
CPC ......... *B60W 10/11* (2013.01); *B60W 2520/04* (2013.01); *B60W 2520/06* (2013.01); *B60W 2520/28* (2013.01); *B60W 2540/10* (2013.01); *B60W 2710/027* (2013.01); *B60W 2710/1005* (2013.01); *B60W 2710/1022* (2013.01); *B60W 2720/30* (2013.01)

(56) References Cited

U.S. PATENT DOCUMENTS

| | | | |
|---|---|---|---|
| 2008/0204214 A1 | 8/2008 | Reith et al. | |
| 2012/0095657 A1* | 4/2012 | Pudvay | F16H 59/12 701/53 |
| 2013/0096787 A1* | 4/2013 | Holub | F16H 61/12 701/54 |

FOREIGN PATENT DOCUMENTS

| | | |
|---|---|---|
| DE | 101 09 662 A1 | 9/2002 |
| DE | 101 28 853 A1 | 12/2002 |
| DE | 10 2004 017 422 A1 | 10/2005 |
| DE | 10 2005 023 246 A1 | 11/2006 |
| DE | 10 2005 023 247 A1 | 11/2006 |
| DE | 10 2006 034 411 A1 | 1/2008 |
| DE | 60 2004 012 248 T2 | 3/2009 |
| DE | 10 2009 036 058 A1 | 2/2011 |
| DE | 10 2009 053 267 A1 | 5/2011 |
| DE | 10 2010 043 250 A1 | 5/2012 |
| DE | 11 2010 002 845 T5 | 11/2012 |
| DE | 10 2011 118 551 A1 | 5/2013 |
| WO | 2008/012160 A1 | 1/2008 |

OTHER PUBLICATIONS

German Search Report Corresponding to 10 2014 207 082.1 mailed Jan. 7, 2015.
German Office Action Corresponding to 10 2014 207 087.2 mailed Jan. 7, 2015.
German Office Action Corresponding to 10 2014 207 088.0 mailed Jan. 7, 2015.
German Office Action Corresponding to 10 2014 207 117.8 mailed Jan. 7, 2015.

* cited by examiner

METHOD FOR FREEING A MOTOR VEHICLE BY ROCKING

This application claims priority from German patent application serial no. 10 2014 207 081.3 filed Apr. 14, 2014.

FIELD OF THE INVENTION

The invention concerns a method for rocking free a motor vehicle having a drive-train with an automatically controllable element for adjusting the drive torque, by means of which the drive torque can be transmitted to at least one drivable vehicle wheel, and which comprises a rotational speed and rotational direction sensor system by means of which vehicle movement and the travel direction thereof as well as a stationary condition of the motor vehicle can be detected, wherein when a driver of the motor vehicle deflects an accelerator pedal to an accelerator pedal position different from a non-actuated position, a desired drive torque can be called for, such that the drive torque adjusting element can be controlled as a function of the drive torque it transmits, and wherein, in a rocking-free situation in which at least one vehicle wheel has to be moved clear of a depression, the driver produces a cyclically fluctuating drive torque at the at least one drivable vehicle wheel by alternately deflecting and releasing the accelerator pedal.

BACKGROUND OF THE INVENTION

A vehicle that has become stuck in a depression-like hollow with spinning wheels, so that the vehicle cannot be driven directly out of the depression because the subsoil friction is insufficient or the subsoil is too yielding, can often be freed from that situation by a so-termed rocking-free maneuver. One possibility for emerging from the depression without outside help consists in rocking the vehicle by driving it cyclically forward and in reverse. In physical terms the forward and backward driving or forward and backward rolling vehicle constitutes an oscillating system which can be energized by a suitable input of energy until the kinetic energy suffices to overcome the edge of the depression.

In vehicles with a manual transmission the driver can carry out a rocking-free process of that kind by rhythmic actuation of the starting clutch and the accelerator pedal and by repeatedly changing between forward and reverse driving, in order successively to rock the vehicle free.

In vehicles with an automated or automatic transmission automatic rocking-free modes are known, which the driver can switch into or which are automatically engaged by virtue of an automatic rocking-free recognition function. The rocking-free process itself then takes place automatically such that a periodically increasing and decreasing drive torque in the forward and/or the reverse direction is produced. The drive torque can for example be produced by a combustion engine, while a gear of the transmission is automatically engaged or disengaged or while a shift automatically takes place repeatedly between a forward gear and a reverse gear. In the case of a hybrid or electric drive, the drive direction can be changed almost without any delay by reversing the current flow in an electric drive motor.

DE 10 2010 043 250 A1 describes a method for the automatic rocking-free of a motor vehicle having an automatic or automated transmission, in which rotational direction information for detecting the travel direction of the motor vehicle at the time is used. A rocking-free function is started if a rocking-free situation is recognized automatically for the motor vehicle or if the driver specifies the same by actuating an operating element, and the function is automatically terminated when the motor vehicle reaches a travel-path dependent or a time-dependent limit. Starting from a position with a stationary wheel in a depression from which the motor vehicle has to be moved clear, to rock it free a drive torque is first built up which acts in a desired travel direction as determined by the gear engaged until the motor vehicle moving in the desired travel direction reaches a forward travel direction reversal point of the depression. This travel direction reversal point is recognized in that the speed at a non-driven wheel falls to zero or the movement direction of the motor vehicle is reversed. The drive torque is then reduced until the motor vehicle, now moving in a direction opposite to the desired travel direction, reaches a rearward travel direction reversal point, and is then built up again. The process is repeated cyclically, whereby the locations of the reversal points are continually adapted and successively migrate out of the depression until the motor vehicle reaches a forward or rear limit point which marks the end of the depression. The limit points are defined by an admissible travel path from the starting position in the relevant travel direction or by an admissible time during which the drive torque is applied, and are continually adapted.

During rocking free, in addition to the alternate build-up and reduction of the drive torque, when the drive torque is reduced the transmission can be shifted to neutral so that in the neutral transmission position the motor vehicle rolls passively backward, or a shift between a forward and a reverse gear can take place so that an active drive torque acts in both rocking directions.

If an electric motor drive is available, then to change between the drive torque acting in the desired travel direction and the drive torque acting in the opposite direction there is no need for a gear change, since the torque direction can be changed by means of the electric drive.

The rocking free as such is carried out fully automatically. However, the driver can have the option to influence the rocking-free function actively by actuating the accelerator pedal, since the function is activated or deactivated depending on a minimum actuation, i.e. a minimum deflection angle of the accelerator pedal and/or since, depending on the acceleration pedal actuation, in each case a maximum drive torque is determined.

DE 10 2005 023 246 A1 describes a method for operating a motor vehicle, in which for a rocking-free function the information from rotational direction sensors is used in order to detect the travel direction of the motor vehicle at the time. When a motor vehicle driving actively toward an edge of a depression in a desired direction, i.e. with a gear engaged and powered by a drive engine, comes to rest, a motor vehicle clutch arranged in the torque flow is opened. When the motor vehicle approaches an opposite depression edge passively in the opposite direction, i.e. when it is rolling back under no power, then when the vehicle comes to rest the motor vehicle clutch is closed again for a new active approach in the desired direction. Alternatively, for the purpose of rocking free, when the motor vehicle comes to rest after driving forward actively a shift is carried out automatically to a reverse gear and correspondingly, after actively driving in reverse, when the motor vehicle comes to rest a shift is carried out to a forward gear.

DE 10 2009 036 058 A1 describes a method for rocking a motor vehicle free, in which a dual-clutch transmission has a rocking-free mode such that in a first partial transmission a forward gear and in a second partial transmission a reverse gear are engaged at the same time, and the drive input is automatically switched between the partial transmissions. The rocking-free mode is automatically activated if, within a short time, the driver shifts the transmission repeatedly between forward drive, reverse and neutral. Or else the driver engages the rocking-free mode manually if he recognizes the need for this or when a display recommends this to him. The vehicle is only operated in the rocking-free mode when the driver actuates the accelerator pedal. Furthermore, a distance sensor system ensures that the rocking-free mode is automatically terminated when a collision with an obstacle is possible if rocking-free continues.

In the case of a vehicle with an automated transmission or with an automatic transmission, if the driver does not want fully automatic rocking free, or if no such fully automatic function is available, or if an existing rocking-free function is to be influenced actively by the driver, then a rocking-free function can be carried out and its sequence controlled by alternate actuation and release of the accelerator pedal. A repeated change of the position of a selector lever between its positions for forward driving, reversing and neutral is also possible. For the driver, however, it is difficult to act in phase during rocking free, i.e. to recognize exactly the respective changeover point between forward and reverse movement and the accordingly most favorable time-point for actuating and releasing the accelerator pedal. For example in a commercial vehicle the driver's cabin can be largely decoupled from a chassis in relation to oscillations by a special cabin suspension system, so that when motor vehicle movement is beginning or coming to an end close to a travel direction reversal point, neither the travel direction nor the movement as such is perceived directly by the driver.

SUMMARY OF THE INVENTION

Against this background the purpose of the present invention is to propose a method for rocking a motor vehicle free, by means of which a driver carrying out or at least influencing a rocking-free process is actively and effectively assisted during this.

This objective is achieved and advantageous design features and further developments of the invention emerge from the description below.

The invention is based on the recognition that during a rocking-free process that he is controlling, the driver of a motor vehicle can be actively and effectively assisted by an automatic drive torque control system, in that the driver's wish, which is converted by actuating the accelerator pedal in the transmission and engine control system into a correspondingly varying drive torque in the drive-train of the motor vehicle, is combined with an automatic reversal point recognition that enables an accurate determination of the reversal point of the motor vehicle's movement within a depression. In this way in-phase torque specifications or torque reductions in the drive-train should be assisted whereas out-of-phase torque inputs in the drive-train should be impeded. For that purpose an automatic control of the closed or open condition of a clutch in the area of the motor vehicle movement reversal point within a depression, just determined, is used to supply the motor vehicle with a maximum amount of kinetic energy during the rocking-free process.

To achieve the stated objective the invention envisages that with the help of the rotational speed and rotational direction sensor system the drive torque adjusting element is controlled in such manner that a torque input to the drive-train, called for by the driver by virtue of the pedal position of the accelerator pedal he is actuating, is suppressed if the travel direction of a current, unpowered vehicle movement is not the same as a forthcoming, powered vehicle movement.

At this point it should be mentioned that the driver can specify a drive torque not only by means of the accelerator pedal, but it can also be signaled in a derivative sense by some other actuating element such as a manual throttle control, or a parameter derived therefrom by virtue of which the driver's wish can be expressed.

The method according to the invention largely avoids the disadvantages that can arise due to out-of-phase control of the drive torque adjusting element, such as the opening or closing of a clutch at the wrong time. This is achieved during rocking free by accurately determining the travel direction and on that basis producing a correctly phased drive torque increase or decrease in the drive-train. The appropriate control signals can preferably be transmitted by way of a high-speed data bus in the vehicle, such as a CAN.

In particular the invention makes use of the fact that in many vehicles, for example in most commercial vehicles, rotational speed sensors and rotational direction sensors are already present for the control of various functions. Consequently, the drive-train control equipment has information about the rolling direction or stationary condition of the vehicle's wheels. It can be concluded that the vehicle is at rest if the rotational speed of at least one non-driven vehicle wheel is zero or approximately zero. When a gear is engaged the travel direction in which a drive torque is built up and the opposite direction, in which the vehicle would roll back if the drive-train were opened, are also known. The rocking-free process can be carried out more effectively with the help of standstill recognition means and the most accurate as possible knowledge of the travel direction reversal points, and can thus be completed more quickly and successfully.

In one embodiment of the invention it can be provided that after power-driven vehicle movement in a first travel direction at or shortly after reaching a first travel direction reversal point, the drive torque adjusting element is shifted to a no-torque condition, in order to enable or assist an unpowered vehicle movement in a second movement direction opposite to the first travel direction, and during the unpowered vehicle movement in the second movement direction, if the driver has called for a drive torque acting in the first travel direction then this is suppressed until a second travel direction reversal point after the unpowered vehicle movement in the second travel direction has been reached.

A travel direction reversal point, or reversal point for short, is understood to mean a position of a rocking-free movement of a vehicle in a depression or the like, at which a vehicle movement in one travel direction has come to a standstill and the vehicle's speed has therefore fallen to zero, and at which thereafter vehicle movement in an opposite direction begins. The point in time when the travel direction reversal point is reached is called the travel direction reversal time.

In a rocking-free process controlled by the driver of a motor vehicle with an automatic or automated transmission, in each cycle the driver tries to input as much kinetic energy as possible into the motor vehicle oscillating in its longitudinal direction. During this, in accordance with the driver's wishes as expressed by the deflection of the accelerator pedal, the engine control and the transmission control systems regulate the drive engine, the transmission and the separator or starting clutch, or some other drive torque adjusting element, such as an electric motor.

In a concrete rocking-free situation, by virtue of an appropriate deflection of the accelerator pedal the driver seeks to produce as high as possible a drive torque without causing the drive wheel or wheels in the depression to spin. If the wheels begin spinning or if the vehicle's movement stops, then a reversal point of the movement has been reached at which the motor vehicle begins or tends to move in the opposite direction. The driver must now release the accelerator pedal as quickly as possible, i.e. move it back to its undeflected position, so that the automatically controlled separator or starting clutch opens quickly and no longer transmits any drive torque. So long as a driving-relevant clutch torque is still transmitted by the separator or starting clutch, the motor vehicle cannot roll freely back in the opposite direction, i.e. first to the deepest point of the depression. When after rolling back the motor vehicle comes to rest, then a reversal point has again been reached. Now, starting from its undeflected position the driver must deflect the accelerator pedal at a time as correctly in phase as possible in order, again, to build up a drive torque for the further rocking of the motor vehicle in its longitudinal direction. So long as no drive torque is transmitted by the separator or starting clutch, there is no torque build-up in the drive-train and the rocking-free process is delayed. On the other hand, if the driver actuates the accelerator pedal before the end of the rolling-back phase, then the drive torque transmitted by the separator or starting clutch acts in the rolling direction and drains kinetic energy from the motor vehicle. By suppressing a driver's accelerator pedal command made at the wrong time, in the method according to the invention an out-of-phase build-up of drive torque in the drive-train, and hence a drain of kinetic energy during rocking free, are prevented.

In a further concrete embodiment of the invention it can be provided that the drive torque adjusting element is a separator or starting clutch of a drive-train in the form of a friction clutch, the drive-train having a drive engine and an automatic transmission which can be brought into driving connection with one another by means of the separator or starting clutch, wherein a drive torque can be transmitted by the separator or starting clutch to the driven vehicle wheel or wheels with which the vehicle has become stuck in a depression, so that on or shortly after reaching a first travel direction reversal point in a desired travel direction after a vehicle movement power-driven with a starting gear engaged, the separator or starting clutch is opened or at least adjusted to a target position in which no drive torque can be transmitted, in order to enable or assist an unpowered rolling back of the vehicle in the opposite direction, and during the rolling-back movement, if the driver issues an accelerator pedal command calling for a drive torque acting in the desired travel direction, this is suppressed and the separator or starting clutch remains open or adjusted for no-torque transmission until the rolling-back movement has ended and a second travel direction reversal point has been reached, whereas on or shortly after reaching the second travel direction reversal point the separator or starting clutch is again closed or at least adjusted to a target position in which a drive torque can be transmitted, in order to enable a new build-up of drive torque in the desired travel direction.

During a rocking-free operation that the driver is controlling or if he intervenes in an automatic rocking-free function, if the driver repeatedly actuates and releases the accelerator pedal in order to rock the vehicle, then in this operating mode the automatically controlled clutch, for its part, responds by opening and closing cyclically. In the method according to the invention the respective travel direction is determined by evaluating the measurement values from the rotational speed and rotational direction sensors. When after an actively driven travel movement the vehicle reaches a first reversal point in the depression, this is recognized by virtue of the sensor system. If the sensors indicate that the vehicle is at rest or is already rolling back, then the control system can open the clutch or adjust it to a target position in which no torque is transmitted. The vehicle can then directly roll back freely into the depression. At the end of this roll-back phase the vehicle reaches the second reversal point, where it again comes to rest. At the second reversal point the control system closes the clutch again or adjusts it to a target position where torque can again be transmitted, so that a drive torque can again be built up in the first travel direction. If the driver has already actuated the accelerator pedal before the end of the roll-back phase because he has interpreted the slow speed close to the second reversal point already as a standstill of the vehicle, then an engagement of the clutch is suppressed until the rotational speed and rotational direction sensors indicate the actual end of the roll-back phase and that the other reversal point has been reached. Accordingly, a counterproductive torque opposed to the rolling direction is reliably prevented.

In addition it can be provided that to recognize a travel direction reversal point, a rotational speed gradient detected by the rotational speed and rotational direction sensor system, which gradient represents the change in time of a rotational speed relevant to the travel direction, is evaluated.

In the area of the reversal points of the rocking-free movement the vehicle speed, and therefore also the rotational speeds that depend on it, approach zero. However, it is very difficult or comparatively complicated to determine accurately and quickly the rotational speed of a rotating component that is approaching a standstill. On the other hand, as explained, this information is important for an accurate and quick determination of the reversal points of the rocking-free movements, at which certain control measures have to be initiated. It is therefore advantageous to consider the rotational speed gradient in order, from the time development of the relevant rotational speed, to deduce the exact time-point when the vehicle comes to rest, in the sense of a prognosis.

This can be done by continually determining the rotational speed gradient of the drive output speed, whereby from the rotational speed gradient at a current time-point at which a current rotational speed exists, which is larger than a specified limit value, a future time-point is calculated, at which the rotational speed falls to zero.

Commonly available rotational speed sensors use the teeth on a toothed disk, or those of gearwheels, to determine the rotational speed of a wheel or a shaft. At very low rotational speeds, the time interval between two pulses of a rotational speed sensor, triggered by the consecutive teeth of a toothed disk, can become relatively long so that it is not clearly evident whether the vehicle is already at rest, or not. In unfavorable cases this results in delayed recognition of a standstill, which makes it more difficult to control the drive torque adjusting element in a correctly phased manner during rocking free. In contrast, by determining the rotational speed gradient, it is made possible, already at a time when the rotational speed is still sufficient for a relatively quick and sure evaluation of the sensor pulses, to deduce a forthcoming standstill. Accordingly this reversal point is deemed to have been reached when the measured rotational speed falls below a limit value and the time when the vehicle comes to rest, pre-calculated with reference to the rotational speed gradient, is reached.

In the description of the invention so far the drive torque adjusting element has been taken, in particular, to be a friction clutch. Basically, the drive torque adjusting element can also be a hydrodynamic clutch, some other shifting element inside or external to the transmission, or an aggregate that produces a drive torque and whose drive torque output can be adjusted quickly.

The invention can be used in both the passenger car and the commercial vehicle sectors, in all vehicles having an automated or automatically controllable drive-train and rotational speed and rotational direction sensors, in order to assist the driver when the vehicle is in a rocking-free situation, during a rocking-free operation that he controls.

BRIEF DESCRIPTION OF THE DRAWINGS

To clarify the invention the description of a drawing of an example embodiment is given below. The drawing shows.

DETAILED DESCRIPTION OF THE PREFERRED EMBODIMENTS

Figure 1:
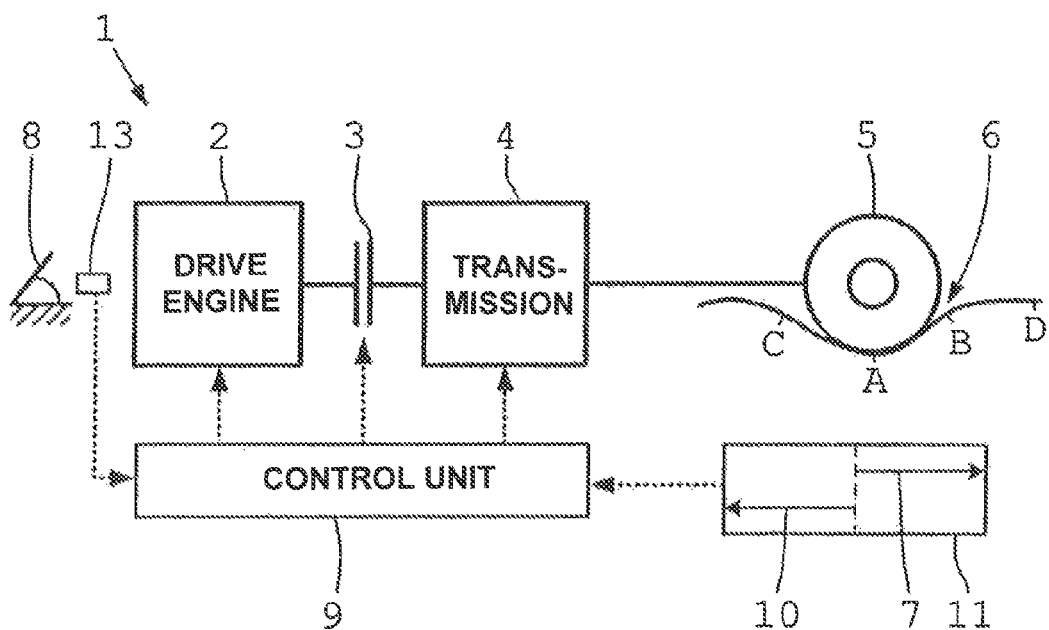
FIG. 1: A schematic representation of a drive-train for carrying out a method for rocking a vehicle free in accordance with the invention

Thus, the drive-train 1 of a motor vehicle shown in FIG. 1 comprises a drive engine 2 in the form of an internal combustion engine, which can be brought into driving connection with an automated transmission 4 by means of a starting clutch 3 (the drive torque adjusting element). A drive output of the transmission 4 is in driving connection with at least one drivable vehicle wheel 5 by way of a differential transmission and driveshafts (not shown).

The internal combustion engine 2, the starting clutch 3 and the transmission 4 are connected to a control unit 9 via sensor and control leads indicated with dotted lines, and can be controlled by means of the unit. In addition an accelerator pedal 8 is indicated schematically, which can be actuated by a driver to control the drive torque. A driver's wish signaled by actuating the accelerator pedal 8 is detected by an accelerator pedal deflection sensor 13 and transmitted to the control unit 9, which carries out the appropriate control and regulation of the internal combustion engine 2, the starting clutch 3 and the transmission 4. In addition a rotational speed and rotational direction sensor system 11 is provided, by means of which the travel direction 7, 10 at the time and the standstill of the vehicle can be determined. This information is also made available to the control unit 9.

The method for rocking a motor vehicle free is explained below with reference to an example scenario. According to this, as shown in FIG. 1 the motor vehicle, with its drive wheel 5, has become stuck in a depression 6 due to a slippery or yielding subsoil, so that the motor vehicle is in a rocking-free situation by which it must be freed from the depression 6 by driving out.

The motor vehicle is first in a position A at the deepest point of the depression 6. The driver wishes to rock free, would like to start, and deflects the accelerator pedal 8 starting from an undeflected position. By means of the internal combustion engine 2, when a starting gear of the transmission 4 is engaged a drive torque is built up in the desired travel direction 7. This travel direction 7 is also the preferred direction for the motor vehicle to leave the depression 6. The motor vehicle moves in the direction toward position B as far as the edge of the depression ahead of it, and comes to a stop at position B due to spinning of the wheels 5 and/or insufficient drive torque. In the present situation this position B constitutes a first reversal point for the vehicle's movement, from which the motor vehicle tends to move in the opposite direction 10, first to position A at the lowest point of the depression 6. At this first travel direction reversal point B the driver releases the deflection of the accelerator pedal 8 in order to allow the motor vehicle to roll back. The rotational speed and rotational direction sensor system 11 indicates to the control unit 9 that the motor vehicle is rolling back, whereupon the unit opens the starting clutch 3 so that the motor vehicle can actually roll back freely.

The motor vehicle now rolls back freely in the second travel direction 10 opposite to the first travel direction 7, during which after passing the position A the kinetic energy of the motor vehicle is converted to potential energy. At the opposite position C the motor vehicle again comes to a stop, since its residual kinetic energy is not yet sufficient for moving all the way through the depression 6. However, unfortunately the driver has been too quick to move the accelerator pedal 8 away from its undeflected position in order to build up again a drive torque in the desired, first travel direction 7. He has wrongly perceived a close approach to the position C, or second reversal point, already as a standstill of the motor vehicle. However, by virtue of the measured values available to it from the rotational speed and rotational direction sensor system 11, the control unit 9 knows the real rolling situation of the motor vehicle, namely that it is still moving. Accordingly the control unit 9 takes no account of the driver's wish for a renewed closing of the starting clutch 3, as signaled by the deflection of the accelerator pedal 8, until the rotational speed and rotational direction sensor system 11 signals that the motor vehicle has actually come to a stop. Only this is interpreted as having reached the second travel direction reversal point C, and only then is the starter clutch 3, actuated by the control unit 9, automatically closed and the motor vehicle driven actively again.

If now sufficient kinetic energy has been supplied to the motor vehicle and the vehicle has therefore been rocked sufficiently in the longitudinal direction, the speed in the desired travel direction 7 at position B of the original reversal point remains higher than zero and the motor vehicle can move past the edge of the depression 6 to a position D ahead. Otherwise the process is repeated until the motor vehicle breaks free from the depression 6.

Figure 2:
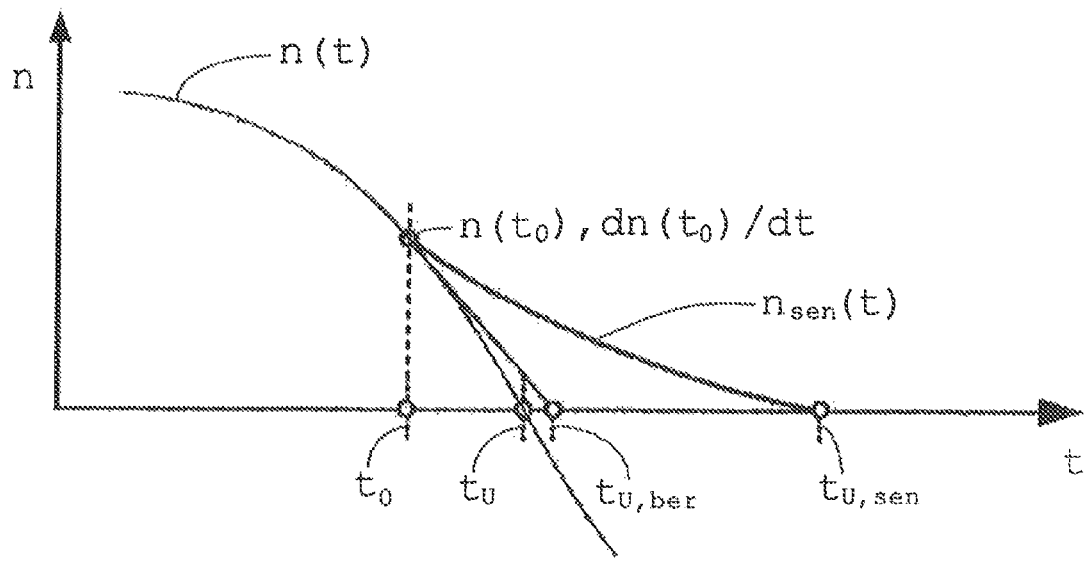
FIG. 2: A variation of rotational speed over time, for pre-calculating a travel direction reversal point during a rocking-free process.

FIG. 2 serves to explain the determination according to the invention of the travel direction reversal points B and C by means of a rotational speed gradient evaluation. According to this the rotational speed and rotational direction sensor system 11 continually measures a rotational speed n(t) that depends on the speed of the vehicle. At an assumed starting time $t_0$ the associated rotational speed is $n(t_0)$, which can still be measured accurately by the rotational speed and rotational direction sensor system 11. The vehicle is moving at a corresponding speed v. However, the vehicle's speed v is already very low, so that the rotational speed and rotational direction sensor system 11 waits a relatively long time for the related pulses of a rotational speed measurement emitter and finally the standstill of the vehicle (rotational speed n=0) would only be determined for a time-point $t_{U,sen}$ lying far ahead. As shown by FIG. 2, however, the vehicle actually comes to rest already at an earlier time $t_U$.

In order to be able to determine this actual vehicle standstill more accurately than before, from the time variation of the rotational speed n(t), the rotational speed gradient dn/dt is calculated continuously. With the value of the speed gradient $dn(t_0)/dt$ at the starting time $t_0$ a later time-point $t_{U,ber}$ is calculated, at which the vehicle-speed-dependent rotational speed n(t) is expected to become zero. This calculated travel direction reversal point $t_{U,ber}$ is close to the actual travel direction reversal point $t_U$ at which the vehicle-speed-dependent rotational speed n(t) is zero and the vehicle has actually come to a stop. The pre-calculated travel direction reversal time-point $t_{U,ber}$ is then used for the control of the starting clutch 3.

According to an embodiment variant of the method the calculation of the travel direction reversal time-point $t_{U,ber}$ as described does not begin until the measured vehicle-speed-dependent rotational speed n(t) falls below a pre-established lower rotational speed limit value.

Figure 3A:
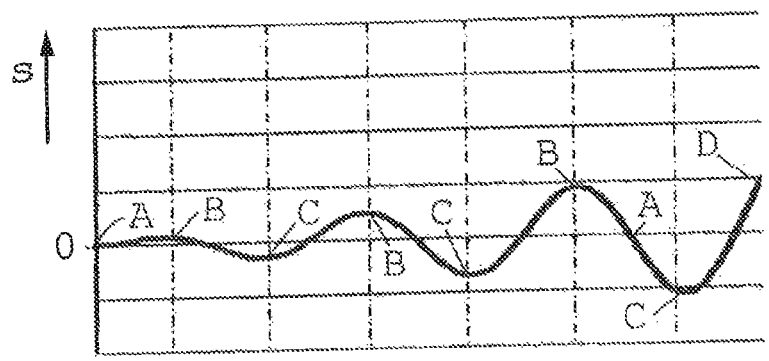
FIGS. 3a to 3d: Functional variations of vehicle movement during a rocking-free process.
Figure 3B:
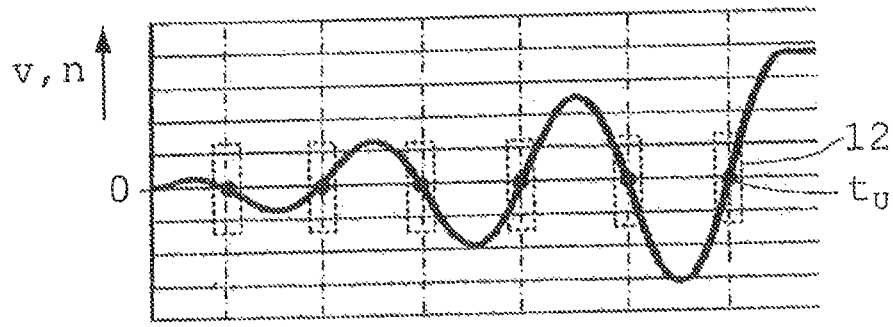
Figure 3C:
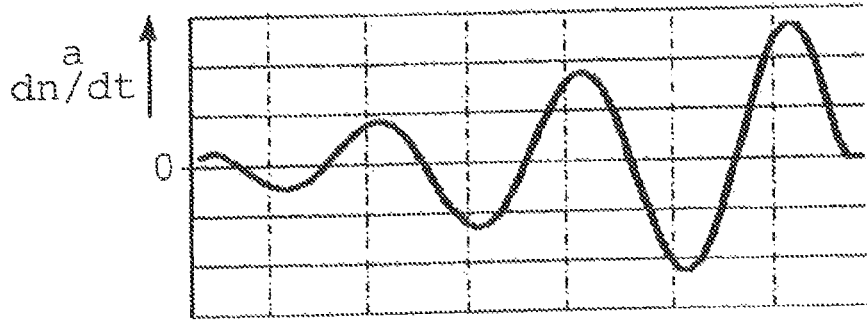
Figure 3D:
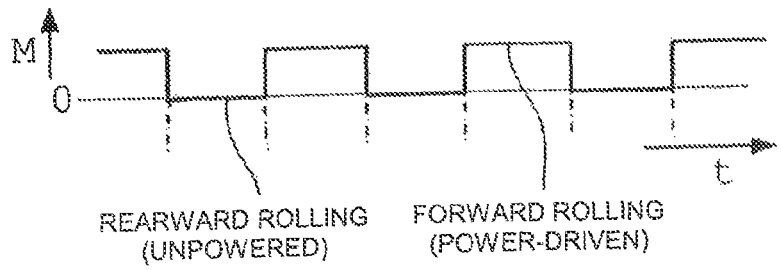

FIGS. 3a to 3b show example functional variations of a motor vehicle during a rocking-free process. FIG. 3a shows the time variation of the path s traveled by the vehicle, while FIG. 3b shows the time variation of the vehicle's speed v, to which a rotational speed n(t) corresponds, FIG. 3c shows the time variation of the vehicle's acceleration a, which corresponds to a rotational speed gradient dn/dt, and FIG. 3d shows the time variation of a drive torque M that acts upon the vehicle wheel 5 sitting in the depression 6.

According to these, the vehicle is initially in the depression 6 in a first rocking-free position that corresponds to the so-termed stuck position A shown in FIG. 1. Thereafter the vehicle rocks to and fro between the local reversal point B and the second local reversal point C. At these two reversal points B, C the vehicle's speed v and the vehicle-dependent rotational speed n at the associated reversal point $t_U$ are equal to zero. During a successful rocking-free process the reversal points B, C successively migrate out of the depression 6 until finally the vehicle breaks free out of the depression 6 in the forward direction and passes the so-termed break-free point D (FIG. 3a). During the rocking-free process the vehicle's speed v and the vehicle's acceleration perceptibly increase periodically (FIGS. 3b, 3c). As FIG. 3d shows, during the rocking-free process the drive torque M(t) is periodically switched on and off, meaning that in the forward-travel phases the drive torque M is introduced into the drive-train with the starting clutch 3 closed (driven forward travel) whereas in the unpowered, rolling-back phases the starting clutch 3 is open (rolling back under no drive power).

In FIG. 3b, which shows the time variation of the vehicle's speed v and the vehicle-speed-dependent rotational speed n, areas 12 are highlighted by means of boxes indicated with dotted lines, in which because the rotational speed n is very low a single determination of the reversal time $t_U$ with reference to the rotational speed measurement would be very inaccurate or markedly delayed in time. In these areas 12 the respective reversal point $t_U$ and the direction change of the vehicle wheel 5 can be pre-calculated very accurately as described by means of the evaluation of the rotational speed gradient dn/dt in accordance with FIG. 2.

LIST OF INDEXES

1 Drive-train
2 Drive engine
3 Drive torque adjusting element, separator or starting clutch
4 Automated transmission
5 Motor vehicle wheel, vehicle wheel
6 Depression
7 First travel direction, desired travel direction
8 Accelerator pedal
9 Control unit
10 Second travel direction, opposite direction
11 Rotational speed and rotational direction sensor system
12 Rotational speed region close to the travel direction reversal time-point $t_U$
13 Accelerator pedal deflection sensor
A Rocking-free position, lowest point of the depression
B Rocking-free position, first travel direction reversal point
C Rocking-free position, second travel direction reversal point
D Rocking-free position, break-free point
M Drive torque
a Acceleration
n Rotational speed
s Travel path
t Time
$t_0$ Starting time
$t_U$ Travel direction reversal time-point
$t_{U,ber}$ Calculated travel direction reversal time-point
$t_{U,sen}$ Measured travel direction reversal time-point
dn/dt Rotational speed gradient
v Speed

The invention claimed is:

1. A method of rocking a motor vehicle free, the motor vehicle comprising a drive-train (1) that has an automatically controllable drive torque adjusting element (3) which can transmit drive torque (M) to at least one drivable vehicle wheel (5), and the motor vehicle having a rotational speed and rotational direction sensor system (11) which can detect vehicle movement and travel direction as well as a standstill of the motor vehicle, the method comprising the steps of:
   producing a desired drive torque when a driver of the motor vehicle deflects an accelerator pedal (8) to an accelerator pedal position different from a non-actuated position of the accelerator pedal;
   controlling the drive torque adjusting element (3) as a function of the accelerator pedal position in relation to the drive torque (M) that can be produced by the driver;
   cyclically fluctuating drive torque at the at least one drivable vehicle wheel (5) in a rocking-free situation in which the at least one drivable vehicle wheel (5) has to be moved clear of a depression (6) when the driver alternately deflects and releases the deflection of the accelerator pedal (8); and
   controlling the drive torque adjusting element (3) with aid of the rotational speed and rotational direction sensor system (11) in such manner that a drive torque input to the drive-train (1), which is specified by the driver by virtue of the accelerator position of the accelerator pedal (8) actuated by the driver, is suppressed so long as the travel direction (10) of a current unpowered vehicle movement is different than the travel direction (7) of a forthcoming power-driven vehicle movement.

2. The method according to claim 1, further comprising the steps of switching the drive torque adjusting element (3) to a no-torque condition, after a driven vehicle movement in a first travel direction (7), either on or shortly after reaching a first travel direction reversal point (B, $t_U$) to either enable or assist with an unpowered vehicle movement in a second travel direction (10) opposite to the first travel direction (7); and
   during the unpowered vehicle movement in the second travel direction (10), suppressing a driver requested drive torque acting in the first travel direction (7) until a second travel direction reversal point (C, $t_U$) is reached at an end of the unpowered vehicle movement in the second travel direction (10).

3. The method according to claim 1, wherein the drive torque adjusting element (3) is either a separator or a starting clutch of the drive-train (1) in a form of a friction clutch, the drive-train (1) comprises a drive engine (2) and an automated transmission (4) which are drivingly connectable with one another by the separator or starting clutch (3), whereby the drive torque (M(t)) is transmittable to the at least one drivable vehicle wheel (5) with which the vehicle became stuck in a depression (6), the method further comprising the steps of:

either on or shortly after reaching a first travel direction reversal point (B, $t_U$) after vehicle movement in a desired travel direction (7) with a starting gear engaged, the separator or starting clutch (3) is either opened or at least adjusted to a target position in which no driving torque (M(t)) is transmittable to either enable or assist an unpowered rolling back of the vehicle in the opposite direction (10);

during the unpowered rolling back of the vehicle, if the driver has actuated the accelerator pedal to call for the drive torque (M(t)) acting in the desired travel direction (7), suppressing the drive torque acting in the desired travel direction and maintaining the separator or starting clutch (3) either disengaged or in a no-torque condition until the rolling back movement ends and a second travel direction reversal point (C, $t_U$) is reached; and either on or shortly after reaching the second travel direction reversal point (C, $t_U$), either engaging or at least adjusting the separator or starting clutch (3) to a target position in which the drive torque (M(t)) is transmittable to enable a new build-up of drive torque (M(t)) in the desired travel direction (7).

4. The method according to claim 1, further comprising the step of evaluating a rotational speed gradient (dn/dt) determined by the rotational speed and rotational direction sensor system (11), the rotational speed gradient represents a change with time of a travel-direction-relevant rotation speed (n), to recognize a travel direction reversal point (B, C, $t_U$).

5. The method according to claim 4, further comprising the step of continually determining the rotational speed gradient (dn/dt) so that from the rotational speed gradient $(dn(t_0)/dt)$ at a current time-point ($t_0$) at which a current rotational speed ($n(t_0)$) exists which is higher than a specified limit value, a future time-point ($t_{U,ber}$) is calculated, at which the rotation speed (n(t)) will be zero.

6. A method of controlling a drive train of a motor vehicle to rock the motor vehicle free from a position in which at least one wheel of the motor vehicle is caught in a depression, the vehicle having a drive-train comprising a transmission and an automatically controllable clutch, which transmits drive torque to the at least one wheel, and a rotational speed and rotational direction sensor system which detects vehicle movement and a direction of travel of the vehicle, a control system communicates with the drive-train, the rotational speed and rotational direction sensor system, and a pedal deflection sensor which detects deflection of an accelerator pedal, the method comprising the steps of:

activating, with the control system, a rocking-free mode when at least one wheel of the motor vehicle is caught in a depression;

detecting, with the rotational speed and rotational direction sensor system, the vehicle movement and the direction of travel of the motor vehicle and detecting, with the pedal deflection sensor, the deflection of the accelerator pedal;

transmitting, via the drive train, cyclically fluctuating drive torque to the at least one wheel of the motor vehicle when the driver alternately deflects and releases deflection of the accelerator pedal; and controlling the clutch, with the control system, to suppress the transmission of drive torque to the at least one wheel of the motor vehicle so long as the rotational speed and rotational direction sensor system detects that the direction of travel of the motor vehicle, during unpowered vehicle movement, is different than the direction of travel of the motor vehicle of forthcoming power-driven vehicle movement.

* * * * *